United States Patent
Chiba (10) Patent No.: US 9,359,001 B2
(45) Date of Patent: Jun. 7, 2016

(54) STEERING DEVICE

(71) Applicant: KAYABA INDUSTRY CO., LTD., Minato-ku, Tokyo (JP)

(72) Inventor: Shuhei Chiba, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/419,243

(22) PCT Filed: Sep. 3, 2013

(86) PCT No.: PCT/JP2013/073624
§ 371 (c)(1),
(2) Date: Feb. 3, 2015

(87) PCT Pub. No.: WO2014/038529
PCT Pub. Date: Mar. 13, 2014

(65) Prior Publication Data
US 2015/0291204 A1 Oct. 15, 2015

(30) Foreign Application Priority Data
Sep. 5, 2012 (JP) ................. 2012-195171

(51) Int. Cl.
*B62D 1/19* (2006.01)
*B60R 21/05* (2006.01)

(52) U.S. Cl.
CPC ............. *B62D 1/195* (2013.01); *B60R 21/05* (2013.01)

(58) Field of Classification Search
CPC ........... B62D 1/19; B62D 1/192; B62D 1/195
See application file for complete search history.

(56) References Cited

U.S. PATENT DOCUMENTS

| | | | |
|---|---|---|---|
| 5,899,116 A | 5/1999 | Armstrong et al. | |
| 2006/0181070 A1* | 8/2006 | Imamura | B62D 1/195 280/777 |
| 2012/0144951 A1* | 6/2012 | Minamigata | B62D 1/195 74/492 |
| 2012/0169035 A1* | 7/2012 | Minamigata | B62D 1/195 280/777 |
| 2012/0186384 A1* | 7/2012 | Minamigata | B62D 1/195 74/492 |

(Continued)

FOREIGN PATENT DOCUMENTS

| | | |
|---|---|---|
| CN | 102438877 A | 5/2012 |
| EP | 1707471 A1 | 10/2006 |

(Continued)

OTHER PUBLICATIONS

Isokawa et al., Shock Absorbing Type Steering Device, JPO, JP 07-215221 A, Machine Translation of Description.*

(Continued)

*Primary Examiner* — James English
(74) *Attorney, Agent, or Firm* — Hauptman Ham, LLP (57) ABSTRACT

A steering device includes: an upper column tube configured to rotatably support the steering shaft; a lower column tube fixed to a vehicle body, the lower column tube being configured to move relative to the upper column tube; a bracket coupled to the upper column tube, the bracket having a notch at the steering wheel side; and a capsule fixed to the vehicle body, the capsule engaging with the notch. A shock absorbing mechanism includes: a bracket fixing portion fitted to the bracket to be integrally fixed; a capsule fixing portion fitted to the capsule to be integrally fixed; and a breakable portion connecting the bracket fixing portion to the capsule fixing portion, the breakable portion being to be broken due to relative movement between the bracket and the capsule.

5 Claims, 6 Drawing Sheets

(56) References Cited

U.S. PATENT DOCUMENTS

| | | | |
|---|---|---|---|
| 2012/0240711 A1* | 9/2012 | Minamigata | B62D 1/195 74/493 |
| 2013/0174685 A1 | 7/2013 | Yamamoto | |
| 2014/0182409 A1* | 7/2014 | Nagase | B62D 1/18 74/493 |
| 2014/0197293 A1* | 7/2014 | Fujiwara | B62D 1/195 248/274.1 |

FOREIGN PATENT DOCUMENTS

| | | | |
|---|---|---|---|
| GB | 1238060 A * | 7/1971 | B62D 1/195 |
| JP | 54-107019 A1 | 8/1979 | |
| JP | 7-215221 A | 8/1995 | |
| JP | 2003-170837 A | 6/2003 | |
| JP | 2007-76613 A | 3/2007 | |
| JP | 2009-154817 A | 7/2009 | |
| WO | 2012/049908 A1 | 4/2012 | |

OTHER PUBLICATIONS

International Search Report and Written Opinion mailed Dec. 10, 2013, corresponding to International application No. PCT/JP2013/073624.

* cited by examiner

STEERING DEVICE

TECHNICAL FIELD

The present invention relates to a steering device to be mounted on a vehicle.

BACKGROUND ART

JP2009-154817A discloses a steering device that includes a shock absorbing mechanism. The shock absorbing mechanism absorbs shock energy generated by collision of a driver with a steering wheel at the time of vehicle collision.

This steering device includes a bracket and a capsule. The bracket is used for mounting an upper column on a vehicle body. The capsule is press-fitted to a flange portion of the bracket. A bolt hole is provided in the capsule. The capsule is fixed to the vehicle body by inserting a bolt through the bolt hole. Additionally, a through hole is provided in each of the bracket and the capsule at a position facing each other. A resin pin is formed by means of injection molding of resin into these through holes. The bracket is fixed to the capsule by means of this resin pin.

At the time of vehicle collision, when a shock is applied to the steering wheel in a direction along which the bracket slides with respect to the capsule due to the collision of the driver with the steering wheel, the resin pin is broken to absorb shock energy.

SUMMARY OF INVENTION

However, in the conventional technique described above, it is necessary to adjust an amount of the resin and pressure thereof during the injection molding of the resin pin into the through holes. Thus, an operator is required to be skilled.

It is an object of the present invention to provide a steering device that includes a shock absorbing mechanism that can absorb a shock at the time of vehicle collision but does not require the operator to be skilled during manufacture.

According to an aspect of the present invention, there is provided a steering device including a shock absorbing mechanism configured to absorb shock energy to be applied to a steering shaft via a steering wheel, the steering device including: an upper column tube configured to rotatably support the steering shaft; a lower column tube fixed to a vehicle body, the lower column tube being configured to move relative to the upper column tube; a bracket coupled to the upper column tube, the bracket having a notch at the steering wheel side; and a capsule fixed to the vehicle body, the capsule engaging with the notch. In this case, the shock absorbing mechanism includes: a bracket fixing portion fitted to the bracket to be integrally fixed; a capsule fixing portion fitted to the capsule to be integrally fixed; and a breakable portion connecting the bracket fixing portion to the capsule fixing portion, the breakable portion being to be broken due to relative movement between the bracket and the capsule.

DESCRIPTION OF EMBODIMENTS

Hereinafter, an embodiment of the present invention will be described with reference to the accompanying drawings.

In the following description, an electric power steering device 100 will be described as an example of the embodiment of the present invention.

First, an overall configuration of the electric power steering device 100 will be explained with reference to FIGS. 1 to 3.

The electric power steering device 100 is a device that assists a steering force to be applied to a steering wheel 8 by a driver using a rotating torque of an electric motor 13.

The electric power steering device 100 includes a steering shaft 1, a steering column 2, and an output shaft 4. The steering shaft 1 is coupled to the steering wheel 8. The steering column 2 rotatably supports the steering shaft 1 that is inserted through the inside of the steering column 2. The output shaft 4 is coupled to the steering shaft 1 via a torsion bar (not shown in the drawings).r The output shaft 4 is coupled to the wheel via a universal joint, a pinion, a rack, and the like. When the driver steers the steering wheel 8, the rack is moved in an axial direction and a direction of the wheel is thus changed. It should be noted that the following description will be explained so as to assume that the steering wheel 8 side denotes an upper side and the wheel side denotes a lower side.

The rotating torque of the electric motor 13 is given, as an assist torque, to the output shaft 4 via a reducer housed in a gear case 32. The electric motor 13 is controlled on the basis of a detection result of a torque sensor that detects a steering force to be applied to the steering wheel 8. The torque sensor is housed in a sensor case 31.

The steering shaft 1 is configured by an approximately cylindrically-shaped upper shaft 11 and an approximately cylindrically-shaped lower shaft 12. An upper end portion of the upper shaft 11 is coupled to the steering wheel 8. The lower shaft 12 is coaxially connected to the upper shaft 11. A lower portion of the lower shaft 12 is coupled to the output shaft 4 via the torsion bar. An upper portion side of the lower shaft 12 is inserted into a hollow portion of the upper shaft 11, and both of them are connected by serration connection. The upper shaft 11 and the lower shaft 12 are connected together to be capable of integrally rotating and relatively moving in the axial direction by the serration connection.

The steering column 2 is configured by an approximately cylindrically-shaped upper column tube 21 and an approximately cylindrically-shaped lower column tube 22. The upper column tube 21 rotatably supports the upper shaft 11 via a bearing 23. The lower column tube 22 is arranged coaxially with the upper column tube 21. A lower end portion of the lower column tube 22 is fixed to the sensor case 31. An upper portion of the lower column tube 22 is inserted into a lower portion of the upper column tube 21. Both the lower column tube 22 and the upper column tube 21 are capable of moving relative to each other in the axial direction. The relative movement in the axial direction between the upper shaft 11 and the upper column tube 21 is restricted by the bearing 23. A tubular small-diameter portion 31a with a smaller diameter than those of other portions is formed at an upper end portion of the sensor case 31. An inner circumferential surface of the lower end portion of the lower column tube 22 is forcibly inserted into an outer circumferential surface of the small-diameter portion 31a.

The output shaft 4 is rotatably supported on the gear case 32 via a bearing 16.

The electric power steering device 100 is mounted on a vehicle body via an upper fixing bracket 33 and a lower fixing bracket (not shown in the drawings). The upper fixing bracket 33 is fixed to the vehicle body, and supports the steering column 2. The lower fixing bracket is fixed to the vehicle body, and swingably supports the gear case 32 via a pair of arms 38a and 38b.

The electric power steering device 100 includes a tilt mechanism, a telescopic mechanism, and a release mechanism. The tilt mechanism allows the steering column 2 to swing around the pair of arms 38a and 38b so that the steering wheel 8 moves in an up-and-down direction (a direction of a solid arrow illustrated in FIG. 2) when viewed from the driver. The telescopic mechanism allows the steering column 2 to expand and contract so that the steering wheel 8 moves in a front-and-back direction (a direction of a dotted arrow illustrated in FIG. 2) when viewed from the driver. The release mechanism can switch between the restriction of swinging and the restriction of expansion and contraction of the steering column 2, and the release of the restrictions of the steering column 2.

In the following description, the tilt mechanism, the telescopic mechanism, and the release mechanism will be explained.

A column bracket 51 is fixed to the upper column tube 21 so that the column bracket 51 surrounds an outer circumference of the upper column tube 21. The column bracket 51 is supported by a support bracket 52 that is fixed to the upper fixing bracket 33. The column bracket 51 is coupled by a guide pin 53 so as to be capable of moving with respect to the support bracket 52.

The support bracket 52 has a pair of sidewalls 52a that extends so as to sandwich both sidewalls 51a of the column bracket 51. The guide pin 53 is provided so as to pass through the both sidewalls 52a of the support bracket 52 and both the sidewalls 51a of the column bracket 51. A guide hole 52b is formed on each of both the sidewalls 52a of the support bracket 52. The guide hole 52b guides movement of the guide pin 53. The guide hole 52b is formed in a direction approximately perpendicular to the axial direction of the steering column 2. Movement of the guide pin 53 along the guide hole 52b causes the column bracket 51 to move along an inner circumferential surface of both the sidewalls 52a of the support bracket 52. This causes the steering column 2 to swing around the pair of arms 38a and 38b, and causes the steering wheel 8 to move in the up-and-down direction when viewed from the driver.

Further, on both the sidewalls 51a of the column bracket 51, a guide hole 51b (see FIG. 3) for guiding movement of the guide pin 53 is formed along the axial direction of the steering column 2. Movement of the guide pin 53 along the guide hole 51b causes the column bracket 51 to move along the inner circumferential surfaces of both the sidewalls 52a of the support bracket 52. This causes the upper column tube 21 to move in the axial direction together with the upper shaft 11, and causes the steering wheel 8 to move in the front-and-rear direction when viewed from the driver.

An operating lever 37 that can be operated by the driver at a driver's seat is rotatably attached on the guide pin 53. Operation of the operating lever 37 causes both the sidewalls 51a of the column bracket 51 to be tighten or released by means of both the sidewalls 52a of the support bracket 52. More specifically, the tightening and release of the tightening are carried out by an action of a cam that rotates in association with the operation of the operating lever 37.

In a case where the operating lever 37 is in a tightening position, it becomes a state that both the sidewalls 51a are tightened by both the sidewalls 52a of the support bracket 52, and the movement of the column bracket 51 with respect to the support bracket 52 is thus restricted. For this reason, swinging of the steering column 2 and expansion and contraction of the steering column 2 are restricted. On the other hand, in a case where the operating lever 37 is in a release position, it becomes a state that the tightening of both the sidewalls 51a of the column bracket 51 by both the sidewalls 52a of the support bracket 52 is released, and movement of the column bracket 51 with respect to the support bracket 52 becomes possible. For this reason, the restriction of swinging and the restriction of expansion and contraction of the steering column 2 are released.

Figure 1:
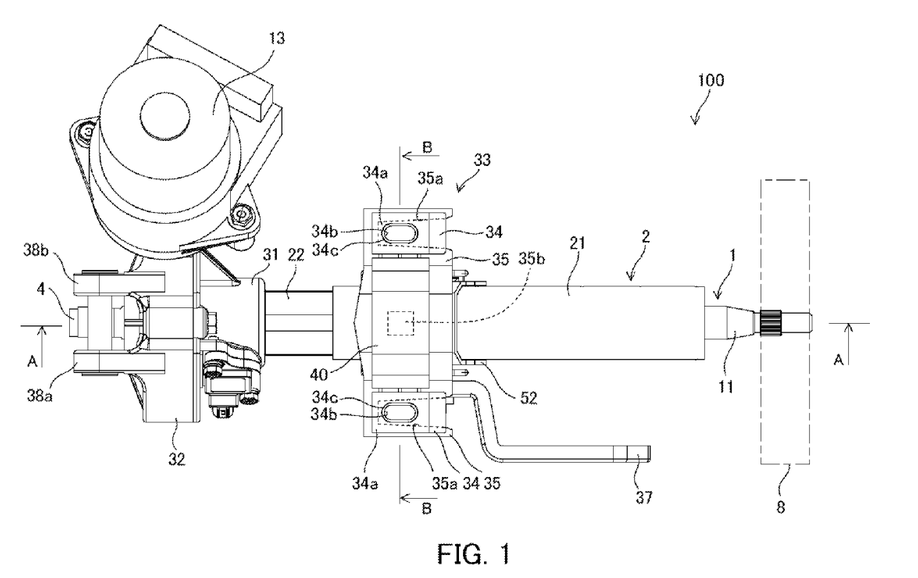
FIG. 1 is a plan view of an electric power steering device according to an embodiment of the present invention.
Figure 2:
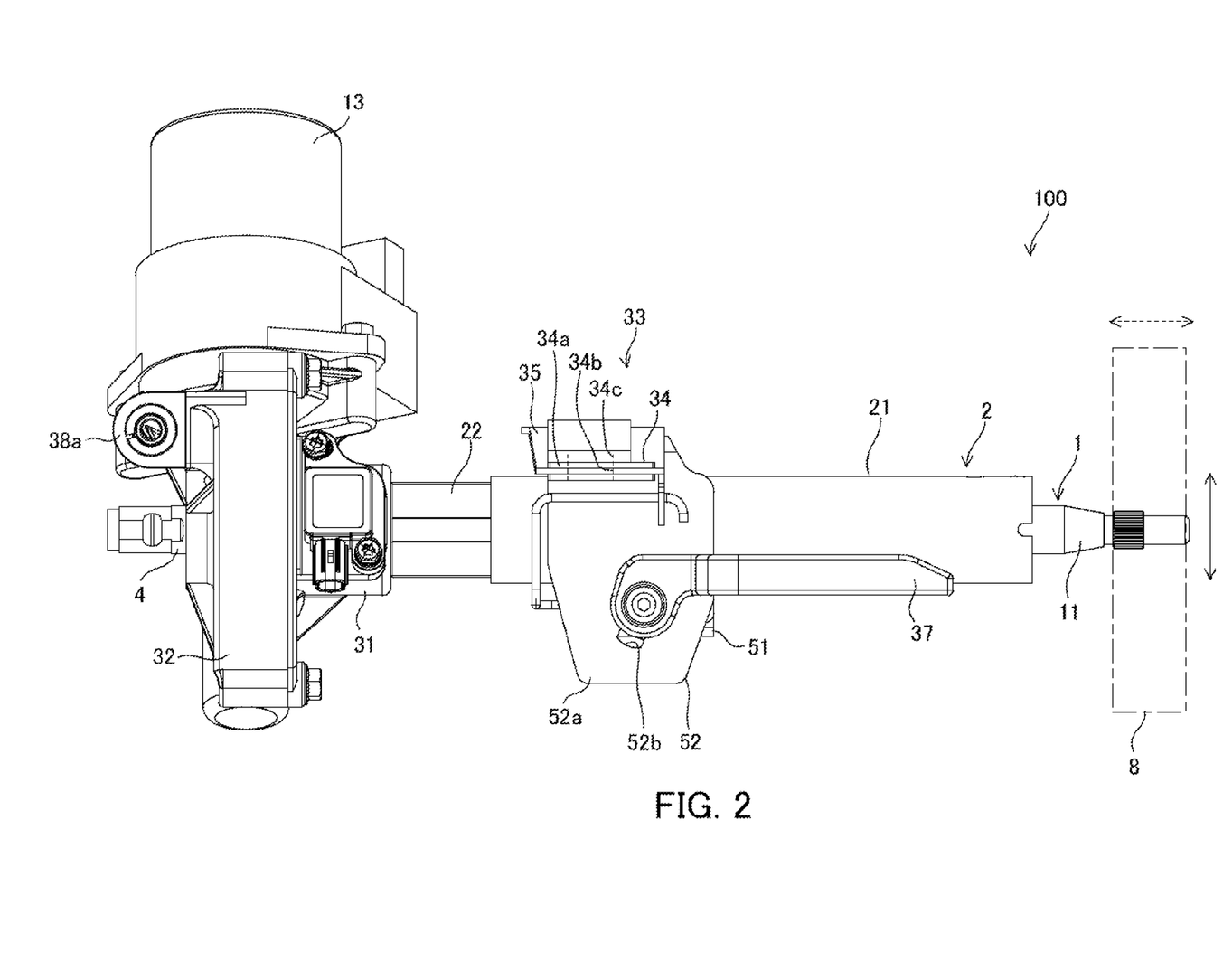
FIG. 2 is a side view of the electric power steering device according to the embodiment of the present invention.
Figure 3:
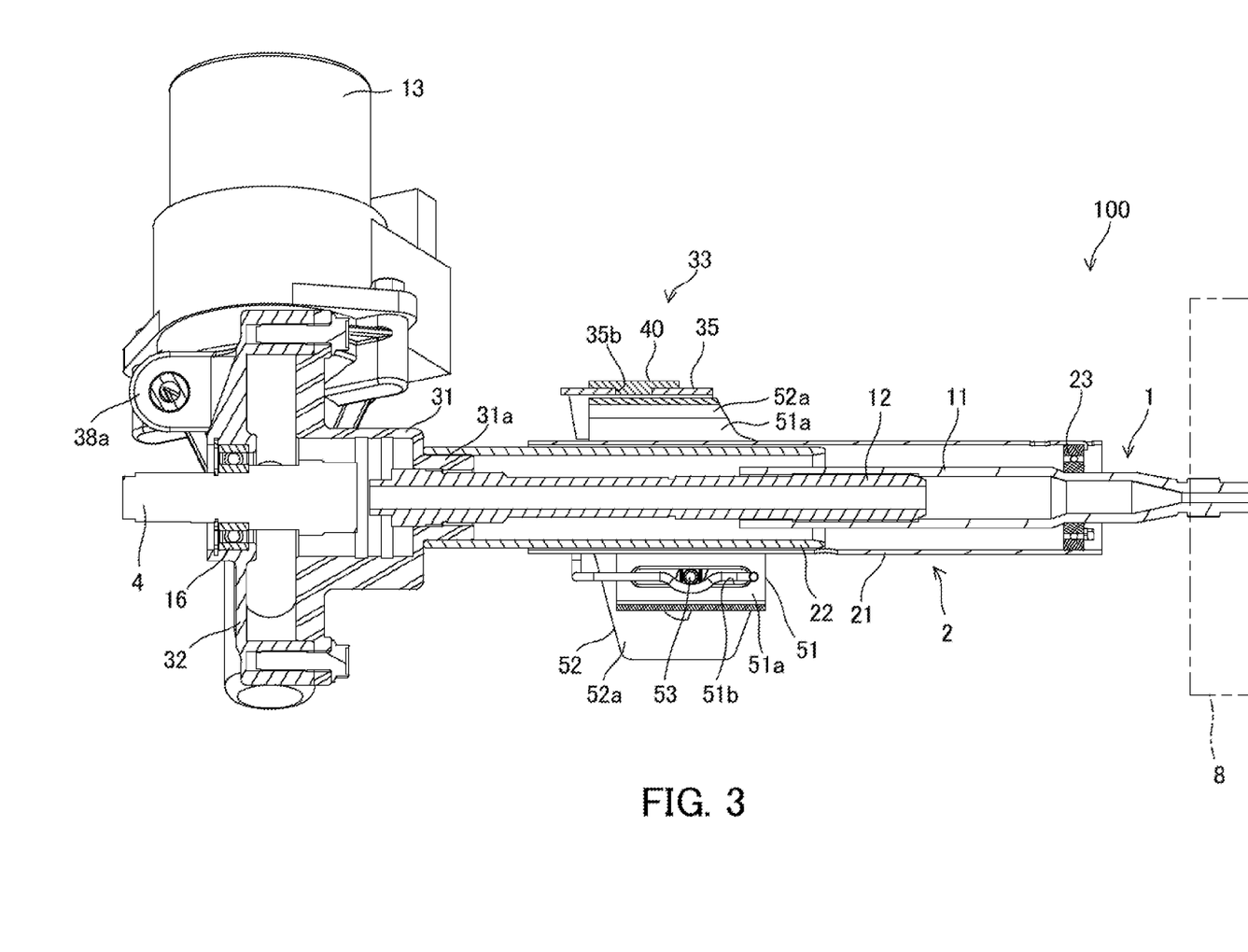
FIG. 3 is a cross-sectional view illustrating a cross section taken along a line A-A in FIG. 1.

As illustrated in FIGS. 1 and 2, the upper fixing bracket 33 is configured by a pair of capsules 34, a bracket 35, and a shock absorbing mechanism 40 made of resin. The capsules 34 are fixed to the vehicle body. The bracket 35 is supported by the pair of capsules 34, and is connected to the support bracket 52. The shock absorbing mechanism 40 restricts relative movement between the capsule 34 and the bracket 35 in the axial direction of the upper column tube 21.

Notches 35a are formed in the bracket 35. The notch 35a is opened to the steering wheel 8 side to engage with the capsule 34. An engaging groove 34a that engages with the notch 35a is formed on both side surfaces of the capsule 34. When the capsule 34 is slided and fitted to the notch 35a from the opening side, the bracket 35 is sandwiched by the capsules 34 to restrict the relative movement between the bracket 35 and the capsules 34 in the direction perpendicular to the axis of the upper column tube 21.

The capsule 34 further includes an insertion hole 34b and a raised portion 34c. The insertion hole 34b allows insertion of a bolt for fixing the capsule 34 to the vehicle body. The raised portion 34c is raised toward the vehicle body side along an outer edge of the insertion hole 34b. The insertion hole 34b and the raised portion 34c are formed approximately in the center of the capsule 34. Additionally, a depressed portion 35b is formed in the bracket 35. The depressed portion 35b is depressed toward the lower side at the upper side (in an upward direction in FIG. 2) of the upper column tube 21.

Figure 4:
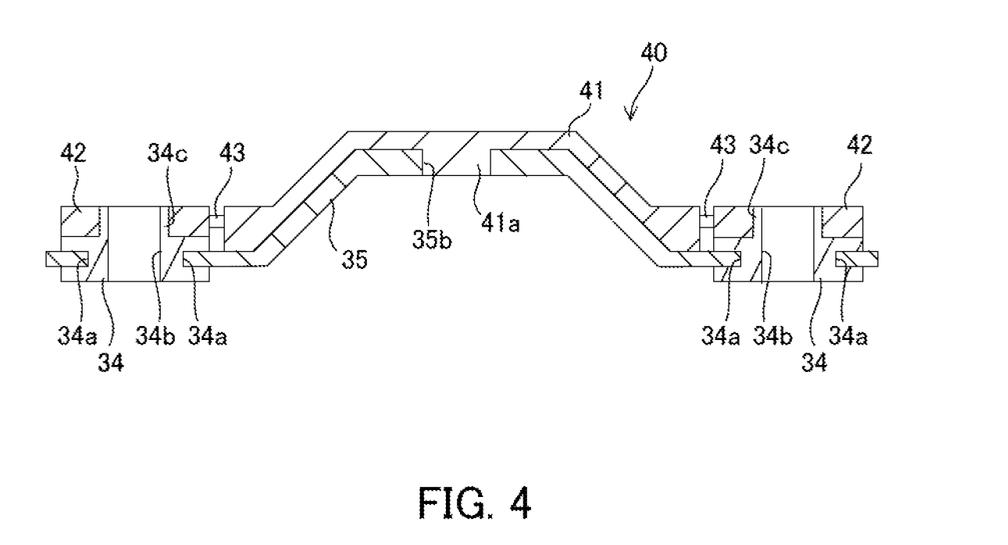
FIG. 4 is a cross-sectional view illustrating a cross section taken along a line B-B in FIG. 1.
Figure 5A:
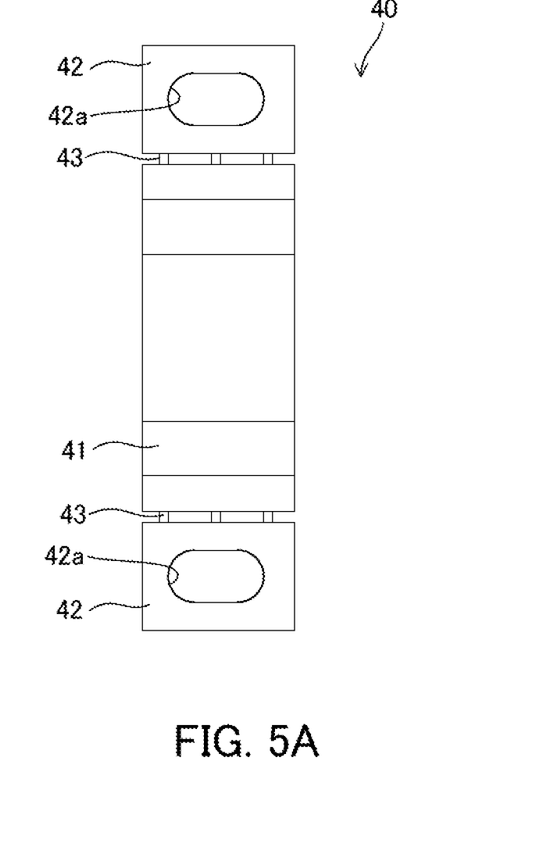
FIG. 5A is a plan view of a shock absorbing mechanism.
Figure 5B:
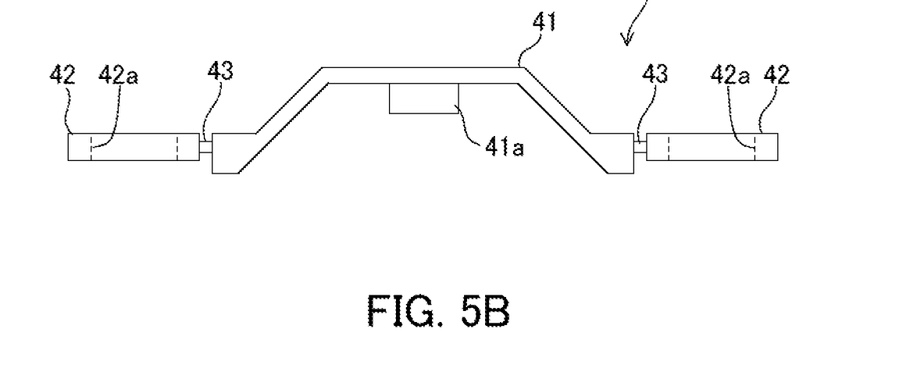
FIG. 5B is a side view of the shock absorbing mechanism when viewed from an axial direction.

Next, the shock absorbing mechanism 40 will be described. FIG. 4 is a cross-sectional view illustrating a cross section taken along a line B-B in FIG. 1. The members other than the bracket, the capsule and the shock absorbing mechanism are omitted in the illustration. FIG. 5A is a plan view of the shock absorbing mechanism 40. FIG. 5B is a side view when the shock absorbing mechanism 40 is viewed from the axial direction of the upper column tube 21.

The shock absorbing mechanism 40 includes a bracket fixing portion 41, a pair of capsule fixing portions 42, and a breakable portion 43 that are integrally molded by resin. The bracket fixing portion 41 includes a projection portion 41a to be fitted to the depressed portion 35b of the bracket 35. The capsule fixing portion 42 includes a through hole 42a that has an inner circumference to be fitted to an outer circumference of the raised portion 34c of the capsule 34. The breakable portion 43 connects the bracket fixing portion 41 to the capsule fixing portion 42.

The bracket fixing portion 41 is integrally fixed to the bracket 35. The capsule fixing portion 42 is integrally fixed to the capsule 34. It should be noted that although FIG. 5A exemplifies three strips for connecting the capsule fixing portion 42 to the bracket fixing portion 41 as the breakable portion 43, the number of strips is not limited to this. Any number can appropriately be set in accordance with desired breaking strength.

When the shock absorbing mechanism 40 is fitted onto the bracket 35 and the capsule 34, the shock absorbing mechanism 40 is arranged from one capsule 34 to the other capsule 34 via the bracket 35. For this reason, the relative movement thereof in the axial direction of the upper column tube 21 is restricted.

In a case where an excessive load acts on the steering shaft 1 through the steering wheel 8 at the time of a vehicle collision, the upper shaft 11 and the upper column tube 21 integrally move in the axial direction so that the guide pin 53 moves until the guide pin 53 comes into contact with a terminating end of the guide hole 51b (a stroke end of the telescopic mechanism). Moreover, the load described above also acts on the bracket 35 from the upper column tube 21 via the column bracket 51 and the support bracket 52. When the load acts on the bracket 35, the bracket 35 attempts to move in a direction to be pulled out from the capsule 34, that is, the opposite direction with respect to the steering wheel 8. At this time, the capsule fixing portion 42 fixed to the capsule 34 and the bracket fixing portion 41 fixed to the bracket 35 move relative to each other to break the breakable portion 43. Accordingly, in a case where the excessive load acts on the steering wheel 8 at the time of the vehicle collision, the upper column tube 21 and the upper shaft 11 move with respect to the vehicle body to absorb shock energy applied to the upper shaft 11.

According to the embodiment described above, it is possible to obtain the following effects.

The shock absorbing mechanism 40 that is broken to absorb the shock energy at the time of the vehicle collision includes: the bracket fixing portion 41 fitted to the bracket 34; the capsule fixing portion 42 fitted to the capsule 34; and the breakable portion 43 that connects the bracket fixing portion 41 to the capsule fixing portion 42. Accordingly, since the shock absorbing mechanism 40 can easily be mounted only by fitting the shock absorbing mechanism 40 to the bracket 35 and the capsule 34, it is possible to manufacture the electric power steering device 100 that includes the shock absorbing mechanism 40 without requiring the operator to be skilled.

Moreover, since the capsule fixing portion 42 is fixed to the capsule 34 by fitting the through hole 42a of the capsule fixing portion 42 to the raised portion 34c of the capsule 34, it is possible to fix the shock absorbing mechanism 40 to the capsule 34 with a simple structure. In addition, since the capsule fixing portion 42 is fixed by the bolt for fixing the capsule 34 to the vehicle body together, it is possible to prevent the capsule fixing portion 42 from being dropped off more reliably.

Furthermore, since the shock absorbing mechanism 40 is made of resin and the bracket fixing portion 41, the capsule fixing portion 42 and the breakable portion 43 are integrally molded, it is possible to reduce a manufacturing cost of the shock absorbing mechanism 40.

Moreover, since the breakable portion 43 is constructed as the three strips for connecting the capsule fixing portion 42 to the bracket fixing portion 41, it is possible to break not the capsule fixing portion 42 or the bracket fixing portion 41 but the breakable portion 43 during the breaking more reliably. In addition, it is possible to appropriately set the breaking strength in accordance with the number of strips.

Embodiments of the present invention were described above, but the above embodiments are merely examples of applications of this invention, and the technical scope of this invention is not limited to the specific constitutions of the above embodiments.

For example, although the electric power steering device 100 has been explained in the embodiment described above, the present invention can be applied to a hydraulic power steering device. In addition, the present invention can also be applied to a steering device that does not assist a steering force to be applied to the steering wheel 8 by the driver.

Moreover, although the shock absorbing mechanism 40 is made of resin in the embodiment described above, he shock absorbing mechanism 40 may be made of any other material.

Figure 6A:
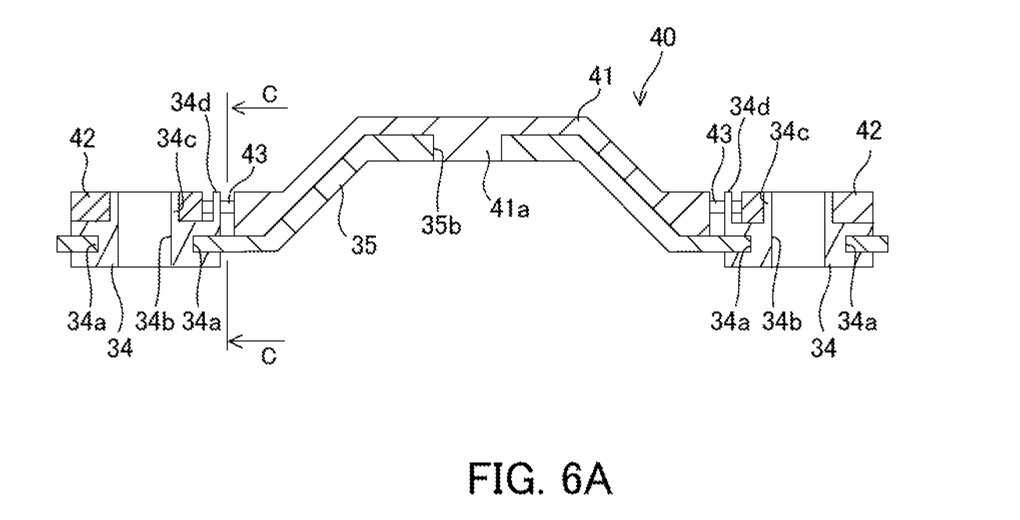
FIG. 6A is a cross-sectional view of the electric power steering device according to another embodiment of the present invention.
Figure 6B:
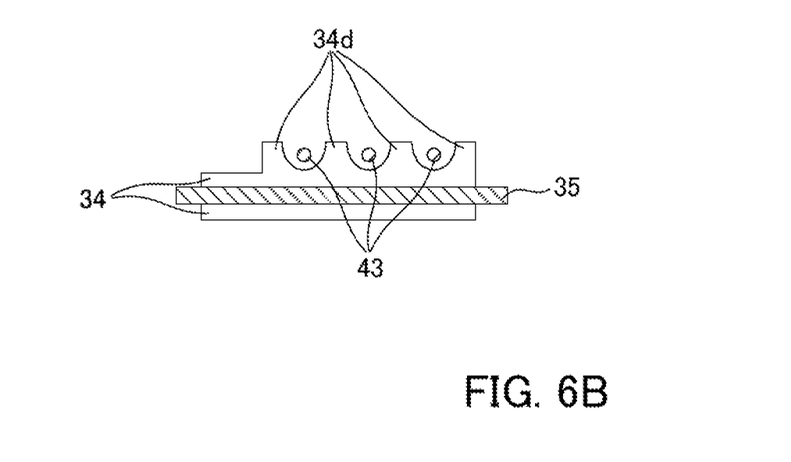
FIG. 6B is a cross-sectional view illustrating a cross section taken along a line C-C in FIG. 6A.

Additionally, as illustrated in FIGS. 6A and 6B, a plurality of hook portions 34d may be provided. The hook portion 34d is provided so as to extend upward (upward in FIG. 6A) from an end surface of the capsule 34 on the bracket 35 side. The hook portions 34d are integrally formed as a part of the capsule 34. An interval between the adjacent hook portions 34d is set to the extent that the hook portion 34d and the breakable portion 43 of the shock absorbing mechanism 40 do not interfere with each other.

Accordingly, in a case where the capsule fixing portion 42 fixed to the capsule 34 and the bracket fixing portion 41 fixed to the bracket 35 are moved relative to each other due to a vehicle collision, the hook portions 34d are pressed to the breakable portions 43. For this reason, it is possible to break the breakable portion 43 more reliably.

Further, a hook portion may be disposed at the bracket 35 in place of the capsule 34. In this case, the hook portion is provided so as to extend upward from a portion between the capsule 34 and the bracket fixing portion 41 on the bracket 35.

Moreover, in the embodiment described above, the shock absorbing mechanism 40, which is fitted to the respective bracket 35 and capsule 34 that move relative to each other at the time of a vehicle collision, is broken at the time of the vehicle collision to perform shock absorbing. However, any other shock absorbing mechanism may be combined.

For example, the following configuration for performing shock absorbing may be combined. Namely, serrations are formed in both an outer circumference of the lower shaft 12 and an inner circumference of the upper shaft 11. The lower shaft 12 is formed in a taper shape to have an outer diameter that becomes larger toward the lower side in the axial direction. At the time of a vehicle collision, the serrations at both members are plastic-deformed or shear-deformed due to the relative movement between the lower shaft 12 and the upper shaft 11, thereby performing shock absorbing.

Moreover, for example, the following configuration for performing shock absorbing may be combined. Namely, the upper column tube 21 side and the lower column tube 22 side are coupled together by an S-shaped plate. Shock absorbing is performed by stroking or drawing the S-shaped plate while moving the upper column tube 21 and the lower column tube 22 relatively to each other at the time of a vehicle collision.

The present application claims priority based on Japanese Patent Application No. 2012-195171 filed with the Japan Patent Office on Sep. 5, 2012, the entire content of which is incorporated into the present specification by reference.

The invention claimed is:

1. A steering device comprising a shock absorbing mechanism configured to absorb shock energy to be applied to a steering shaft via a steering wheel, the steering device comprising:

an upper column tube configured to rotatably support the steering shaft;
a lower column tube fixed to a vehicle body, the lower column tube being configured to move relative to the upper column tube;
a bracket coupled to the upper column tube, the bracket having a notch at the steering wheel side; and
a capsule fixed to the vehicle body, the capsule engaging with the notch,
wherein the shock absorbing mechanism includes:
   a bracket fixing portion fitted to the bracket to be integrally fixed;
   a capsule fixing portion fitted to the capsule to be integrally fixed; and
   a breakable portion connecting the bracket fixing portion to the capsule fixing portion, the breakable portion being to be broken due to relative movement between the bracket and the capsule.

2. The steering device according to claim 1,
wherein the capsule includes an insertion hole allowing insertion of a bolt for fixing the capsule to the vehicle body, and a raised portion that is raised toward a vehicle body side along an outer edge of the insertion hole,
wherein the capsule fixing portion has a through hole with an inner circumference that is to be fitted to an outer circumference of the raised portion, and
wherein the capsule fixing portion is fixed by fitting the through hole to the raised portion.

3. The steering device according to claim 1,
wherein the shock absorbing mechanism is made of resin, and
wherein the bracket fixing portion, the capsule fixing portion and the breakable portion are integrally molded.

4. The steering device according to claim 1,
wherein the breakable portion is one or more strips for connecting the bracket fixing portion to the capsule fixing portion.

5. The steering device according to claim 4, further comprising:
a hook portion disposed to extend from the capsule or the bracket between the strips of the breakable portion, the hook portion pressing the breakable portion by relative movement between the bracket and the capsule.

* * * * *